April 11, 1961    R. E. MERCIER    2,979,174
CHANGE SPEED GEAR FOR TOYS AND REDUCED SCALE MODELS
Filed March 30, 1959    3 Sheets-Sheet 1

INVENTOR
ROBERT ERNEST MERCIER
By Irwin S. Thompson
ATTY.

April 11, 1961  R. E. MERCIER  2,979,174
CHANGE SPEED GEAR FOR TOYS AND REDUCED SCALE MODELS
Filed March 30, 1959  3 Sheets-Sheet 2

INVENTOR
ROBERT ERNEST MERCIER
BY Irwin S. Thompson
ATTY.

United States Patent Office 2,979,174
Patented Apr. 11, 1961

2,979,174

CHANGE SPEED GEAR FOR TOYS AND REDUCED SCALE MODELS

Robert Ernest Mercier, Paris, France, assignor to Librairie Hachette, Paris, France, a corporation of France Filed Mar. 30, 1959, Ser. No. 802,831

Claims priority, application France Apr. 11, 1958

8 Claims. (Cl. 192—4)

My invention has for its object a change speed gear for toys and reduced scale models and it covers more particularly a change speed gear resorting to simple means and allowing however the execution of various movements with a considerable adaptability in use, while said change speed gear is also bestowed with a great sturdiness and is very cheap so that it is highly suitable for use with toys and reduced scale models.

According to my invention, the change speed gear includes a sliding gear which is constantly in mesh with a driven pinion, while it may selectively engage either of two driving pinions rotating in opposite directons and extending to either side of the sliding gear.

According to a further feature, the sliding gear is adapted to mesh with a stationary toothed sector when it occupies an intermediate position between its positions engaging the two driving pinions.

Through this arrangement, it is possible, by shifting the sliding gear, to make the driven pinion revolve in either direction or else to be held fast against rotation.

The characteristic features and advantages of the invention will appear readily in the reading of the following description of a preferred embodiment of the improved change speed gear according to the invention, said embodiment, given by way of example, being illustrated in the accompanying drawings, wherein.

The same parts are designated by the same reference numbers in the different Figs. 1 to 4.

Figure 1:
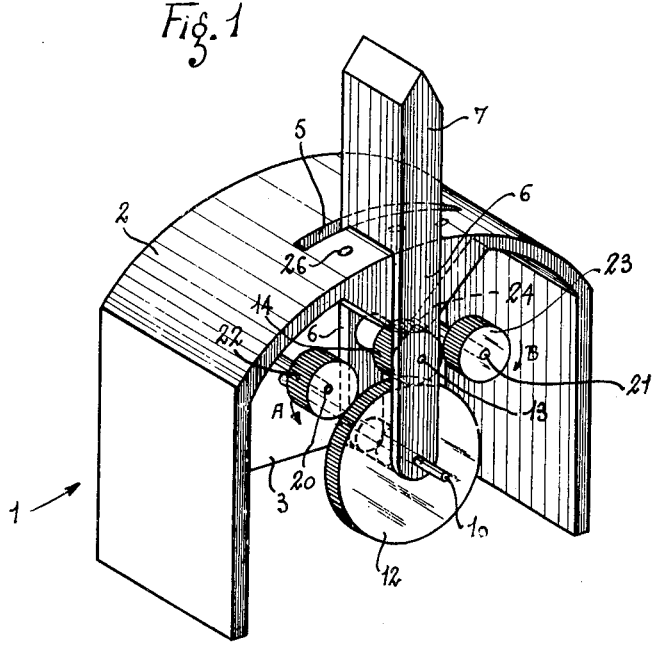
Fig. 1 is a diagrammatic perspective view showing a fraction of the change speed gear, the speed selecting lever being in an inoperative position.

A casing 1 made preferably of a plastic material such as a shock-resisting polystyrene of a generally parallelopipedic shape includes a cover 2, the surface of which forms a portion of a cylinder, the axis of which is perpendicular to two transverse side walls of the casing, of which only one, shown at 3, is illustrated.

Transverse notches 5 are formed in said cover 2 for the passage of the arms 6 of the speed-selecting levers 7, each lever including two such arms forming together a fork.

A number of parallel shafts or spindles are carried by bearings formed in the wall 3 and in the opposite wall, so as to extend perpendicularly through said walls, said shafts carrying various pinions.

Figure 2:
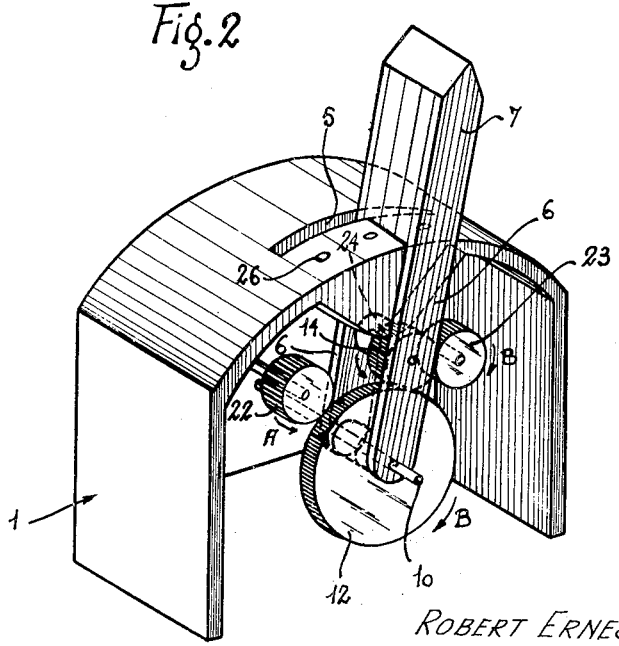
Fig. 2 is a view similar to Fig. 1, the speed selecting lever being in a speed engaging position.

The change speed gear according to the invention may include a plurality of speed-selecting levers 7, say three in the embodiment described hereinafter. One of said levers will be now described with further detail, together with the corresponding spindles and pinions, as shown in Figs. 1 and 2. A spindle 10, which is common to all the levers 7, is arranged coaxially with the cover 2 and passes through two arms 6 of the lever 7, as provided by bores formed in the lower ends of said arms. Said spindle also carries within the fork formed by said arms of said lever 7 a driven pinion 12 rigid with the spindle 10. A short spindle 13 parallel with the spindle 10 is fitted between the two arms of the lever and carries, freely rotatable thereon, a small sliding gear 14 in permanent mesh with the driven pinion 12. In horizontal registry with said spindle 13 and to either side of the vertical plane of symmetry of the casing passing through the spindle 10, two further spindles 20 and 21 parallel with the preceding spindles carry each a driving pinion respectively shown at 22 and at 23, said pinions lying in the same transverse plane as the pinions 12 and 14, so as to rotate in opposite directions, as illustrated by the arrows A and B.

The lower surface of the cover 2 carries between the notches 5 engaged by the arms 6 a toothed sector 24 adapted to engage the sliding gear 14, when the lever is in its medial position illustrated in Fig. 1, said toothed sector forming a depending section of said cover.

The lever may rock round the spindle 10 and occupy two stable extreme positions located symmetrically of its medial position and of which one is illustrated in Fig. 2.

The lever 7 may be locked in any conventional manner in each of said three positions of utilisation, for instance by means of a bolt which is not illustrated and which is associated with the lever and is urged elastically into recesses 26 provided in the cover in registry with the different positions which may be assumed by the lever 7.

When reaching each extreme position, the travel of the lever has been such that the sliding gear 14 engages either the driving pinion 22 or the driving pinion 23 and meshes therewith.

The operation of the section of the change speed gear which has just been described will readily appear to the mind; when the lever 7 is in its medial position (Fig. 1), the driving gear 14 engaging the teeth of the sector 24 can no longer rotate and since it meshes with the driven pinion 12 rigid with the spindle 10, it prevents any rotation of the latter spindle in either direction.

If, starting from said medial position, the lever 7 is urged rearwardly for instance as illustrated in Fig. 2, the gear 14 is released with reference to the teeth of the toothed sector 24 and engages the driving pinion 23 rotating in the direction of the arrow B; the lever 7 is held in said position by the above mentioned bolt and the gear is driven into a direction opposed to the direction of rotation of the pinion 23 and consequently, the driven pinion 12 and its spindle 10 rotate in the same direction B as the pinion 23.

Obviously, if the lever 7 is urged forwardly (which condition is not illustrated), the sliding gear 14 engages the driving pinion 22 revolving in the direction A and this results in a starting of the driven pinion 12 into rotation and of the spindle 10 in the same direction A.

If, for instance, a wire, carrying at its free end a weight to be raised, is wound round the spindle 10 in a manner such that the rotation of said spindle in the direction A produces a reduction of the free length of said wire and, consequently a raising of the suspended weight, it is sufficient to push the lever 7 forwardly to raise the weight. The desired level being reached by the weight, the lever 7 is set in its medial position and the spindle 10 is thus held fast against rotation so that the weight is stopped in its upward movement and is maintained at the level reached by it. It should be remarked that the travel of the gear 14 between an extreme position and the medial position corresponding to its stationary condition is very short and that this gear is practically never free of any engagement which prevents any untimely unwinding of the wire.

If it is desired to make the weight sink by a controlled extent, it is obviously sufficient to push the lever rearwardly and the weight may be stopped at any moment of its downward movement through a return of the lever 7 into its medial position.

In the arrangement described, the driven pinion 12 is secured to the spindle 10 and its rotation constrains the latter to rotate. As described hereinafter, it is also possible to use a pinion 31 (see Figs. 3 and 4) similar to said pinion 12 revolving freely on the spindle 10 and to make said pinion mesh permanently with a gearing 51—52—54 (see Fig. 3) adapted to drive a final output shaft 55.

To the three possible positions which may be assumed by the lever 7 correspond then three possible speed conditions for the output shaft: rotation in one direction, rotation in the opposite direction and stationary condition.

Figure 3:
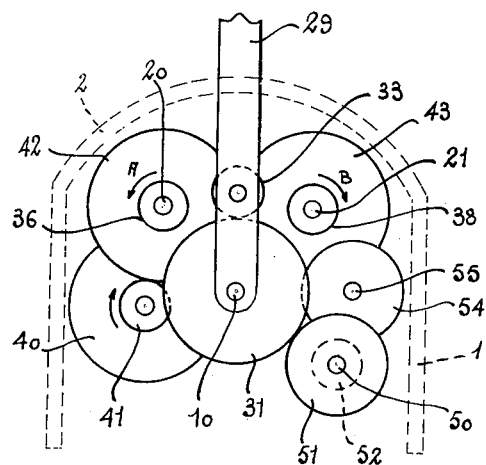
Fig. 3 is a diagrammatic plan view showing the different gears of the improved change speed gear.
Figure 4:
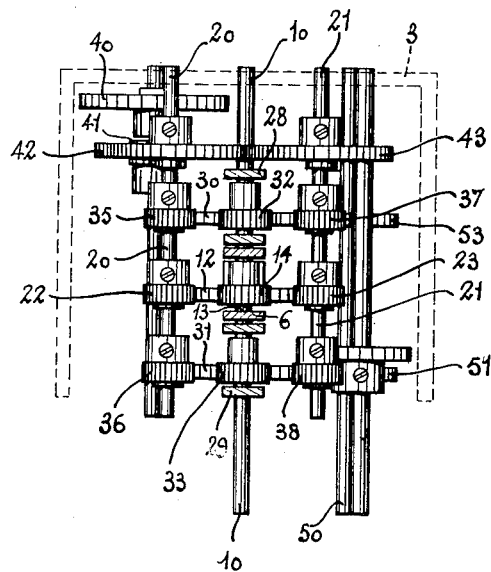
Fig. 4 is an elevational view corresponding to Fig. 3.

Figs. 3 and 4 illustrate a change speed gear executed in accordance with the invention and in which the different parts already referred to are shown again.

The common spindle 10 carries to either side of the above mentioned lever 7, two levers 28 and 29 similar to the latter and between the arms of which are fitted respectively two driven pinions 30 and 31 adapted to revolve freely over said spindle 10 and meshing each with a corresponding sliding gear 32 or 33 similar to the gear 14, while toothed sectors similar to the sector 24 hold them fast when the corresponding levers are in their medial position. Furthermore the shafts 20 and 21 carry to either side of the above-described pinions 22 and 23 further driving pinions 35 and 36 or 37 and 38, as the case may be, in registry with the associated sliding gears 32 and 33. The driving pinions 35, 22 and 36 rigid with the shaft 20 revolve in the direction A while the driving pinions 27, 33 and 38 rigid with the shaft 21 revolve in the direction B.

This rotation in opposite directions of the shafts 20 and 21 is obtained, in the present case, through the agency of a driving shaft which is not illustrated controlling the toothed wheel 40 (Fig. 3) rigid with the pinion 41 which drives in the direction of the arrow A a toothed wheel 42 rigid with the shaft 20. This wheel 42 meshes with an equal-sized wheel 43 secured to the shaft 21 which is thus driven in the direction of the arrow 3.

A shaft 50 is located on the same side of the spindle 10 as the driving pinion 23, at a level lower than that of said spindle 10. Said shaft 50 carries a pinion 51 meshing with the pinion 31 and rigid with the pinion 52 revolving freely therewith on the shaft 50, while a further pinion 53 rigid with said shaft 50 meshes with the pinion 30. Lastly, a pinion 54 rigid with a further spindle 55 meshes with the above mentioned pinion 52.

It is thus apparent that the setting of the lever 28 in its medial position holds the pinion 32 against rotation and, consequently also, the pinion 30 and the pinion 53 and thereby the shaft 50 connected therewith.

Similarly, if the lever 29 is set in its medial position this holds fast against rotation the pinions 33, 31, 51, 52 and 54 and, thereby, the shaft 55 rigid with said pinion 54.

Furthermore, if the lever 28 or 29 is set in either of the extreme positions defined hereinabove, this will lead to the rotation of the shaft 50 or of the shaft 55 in either direction.

Figure 5:
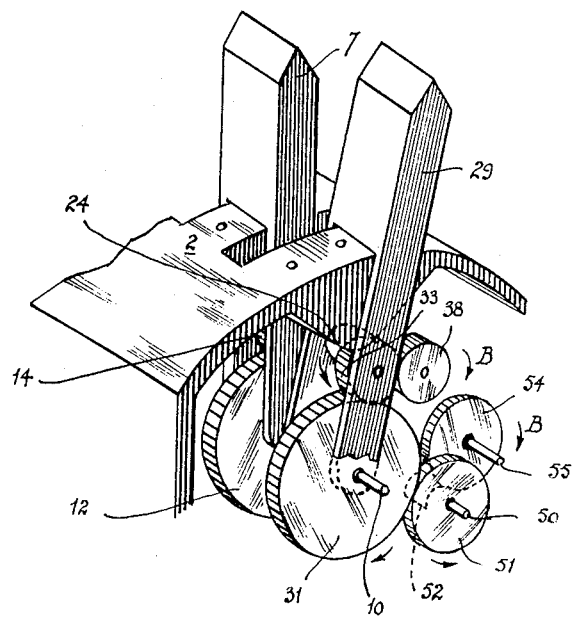
Fig. 5 is a diagrammatic perspective view showing a fraction of the change-speed gear with two speed-selecting levers, one of the levers being in an inoperative position, the other lever being in a speed-engaging position.

Such a disposition is illustrated in Fig. 5.

As in Fig. 1, lever 7 is in neutral position and, the gear 14 being in engagement with the rack 24 on casing 2, the driven pinion 12 and its shaft 10 are prevented from rotation.

However, it is to be noted, this does not lock up the entire gear system.

When the lever 29 is set in a power-transmitting position, such as is illustrated in Fig. 5, gear 33 meshes with driving gear 38 and, being driven thereby, causes drive of gear 31 despite the locking of the shaft 10 since gear 31 is free to rotate with respect to shaft 10.

The gear 31 causes rotation of gear 51 which is freely rotatable on shaft 50 but fixed or rigid with gear 52, which causes rotation of gear 54 which is rigid with the shaft 55.

Thus, although the shaft 10 is locked, rotation of the shaft 55 in opposite directions is readily effected by rocking the lever 29 to either side of the neutral position. Similarly, rotation of shaft 55 is possible even if the shafts 10 and 50 are both locked up, since the gears 51 and 52 are freely rotatable on the shaft 50.

Thus, the stopping and the rotation of the shaft 50 and/or 55 have no action on the rotary condition of the spindle 10 which may revolve freely with reference to the pinions 30 and 31. This leads to a complete independence between the different output shafts, any combination of a stoppage or of a rotation in either direction of the different shafts being allowed.

Furthermore, through a suitable selection of the ratios between the diameters of these different pinions, it is possible to obtain, for any given speed of the driving shaft, any desired speed for the different output shafts 10, 50 and 55.

The present invention is obviously by no means limited to the embodiments described and illustrated and many modifications may be brought therein within the scope of the accompanying claims. In particular, the number of output shafts and consequently, of selecting levers may be larger, the relative arrangement of the shafts may be different and the material used may be selected as desired etc.

What I claim is:

1. A change speed gear, chiefly for toys and reduced scale models, comprising a carrier adapted to be shifted in parallelism with a plane between a medial inoperative position and either of two extreme positions, a driven pinion revolubly carried by the carrier round an axis perpendicular to the plane of shifting of said carrier, a gear coplanar and in permanent mesh with said driven pinion and revolubly carried by the carrier round an axis parallel with the first-mentioned axis, two driving pinions coplanar with said driven pinion and gear and rotating in opposite directions round stationary axes parallel with the first-mentioned axes and located to either side of said pinion and gear for the inoperative position of said carrier, the coplanar gear engaging respectively one of the two driving pinions for the corresponding operative positions of the carrier, and a stationary toothed sector engaging the coplanar gear for the medial inoperative position of the carrier to hold said gear and therewith the driven pinion against rotation.

2. A change speed gear, chiefly for toys and reduced scale models, comprising a flat lever terminating with two transverse arms and adapted to pivot round a line extending in its plane through said arms, between two operative positions through a medial inoperative position, a spindle carried between the lever arms coaxially with the pivotal axis of the lever, a driven pinion carried coaxially by said spindle, a further spindle carried between the lever arms in parallelism with the pivotal axis of the lever, a sliding gear coplanar with the driven pinion, coaxially carried by said further spindle and permanently meshing with the driven pinion on the first spindle, two driving pinions coplanar with said driven pinion and gear and rotating in opposite directions round stationary axes parallel with said pivotal axis and located to either side of said pinion and gear for the inoperative position of said lever, the coplanar gear engaging respectively one of the two driving pinions for the corresponding operative position of the lever, and a stationary toothed sector engaging the coplanar gear for the medial inoperative position of the lever to hold said gear and therewith the driven pinion against rotation.

3. A multiple change speed gear, chiefly for toys and reduced scale models, comprising a plurality of levers adapted to pivot round an axis parallel with a predetermined direction between an inoperative medial position and either of two extreme operative positions, a driving wheel revolubly carried by each lever coaxially with its pivotal axis, a sliding gear coplanar with each driven wheel, revolubly carried by the corresponding lever and permanently meshing with the coplanar driven wheel, two driving wheels coplanar with each driven wheel and gear system, rotating in opposite directions round stationary axes located to either side of said system and adapted to be engaged selectively by the corresponding driven wheel upon pivotal shifting of the corresponding lever out of its medial position into an operative position registering with the driving wheel considered, and a stationary series of teeth engaging and preventing rotation of each sliding gear when the latter is set with the corresponding lever in its medial inoperative position.

4. A multiple change speed gear, chiefly for toys and reduced scale models, comprising a plurality of levers, a common spindle forming a pivot for all the levers to allow their shifting between an inoperative medial position and either of two extreme operative positions, a driven wheel revolubly carried by each lever coaxially with said spindle, a sliding gear coplanar with each driven wheel, revolubly carried by the corresponding lever and permanently meshing with the coplanar driven wheel, two driving wheels coplanar with each driven wheel and gear system, rotating in opposite directions round stationary axes located to either side of said system and adapted to be engaged selectively by the corresponding driven wheel upon pivotal shifting of the corresponding lever out of its medial position into an operative position registering with the driving wheel considered, and a stationary series of teeth engaging and preventing rotation of each sliding gear when the latter is set with the corresponding lever in its medial inoperative position.

5. A multiple change speed gear, chiefly for toys and reduced scale models, comprising a plurality of levers, a common spindle forming a pivot for all the levers to allow their shifting between an inoperative medial position and either of two extreme operative positions, a driven wheel revolubly carried by each lever coaxially with said spindle, one of said driven wheels being keyed to said common spindle, a sliding gear coplanar with each driven wheel, revolubly carried by the corresponding lever and permanently meshing with the coplanar driven wheel, two driving wheels coplanar with each driven wheel and gear system, rotating in opposite directions round stationary axes located to either side of said system and adapted to be engaged selectively by the corresponding driven wheel upon pivotal shifting of the corresponding lever out of its medial position into an operative position registering with the driving wheel considered, and a stationary series of teeth engaging and preventing rotation of each sliding gear when the latter is set with the corresponding lever in its medial inoperative position.

6. A multiple change speed gear, chiefly for toys and reduced scale models, comprising a plurality of levers, a common spindle forming a pivot for all the levers to allow their shifting between an inoperative medial position and either of two extreme operative positions, a driven wheel revolubly carried by each lever coaxially with said spindle, a sliding gear coplanar with each driven wheel, revolubly carried by the corresponding lever and permanently meshing with the coplanar driven wheel, a common stationary spindle located to either side of the lever system, two driving wheels coplanar with each driven wheel and gear system, rotating round the corresponding stationary spindle and adapted to be engaged selectively by the corresponding driven wheel upon pivotal shifting of the corresponding lever out of its medial position into an operative position registering with the driving wheel considered, the driving wheels carried by the two stationary spindles revolving in opposite directions, and a stationary series of teeth engaging and preventing rotation of each sliding gear when the latter is set with the corresponding lever in its medial inoperative position.

7. A change speed gear, chiefly for toys and reduced scale models, comprising a carrier adapted to be shifted in parallelism with a plane between a medial inoperative position and either of two extreme operative positions, a driven pinion revolubly carried by the carrier round an axis perpendicular to the plane of shifting of said carrier, a gear coplanar and in permanent mesh with said driven pinion and revolubly carried by the carrier round an axis parallel with the first-mentioned axis, two driving pinions coplanar with said driven pinion and gear and rotating in opposite directions round stationary axes parallel with the first-mentioned axes and located to either side of said pinion and gear for the inoperative position of said carrier, the coplanar gear engaging respectively one of the two driving pinions for the corresponding operative positions of the carrier, a stationary toothed sector engaging the coplanar gear for the medial inoperative position of the carrier to hold said gear and therewith the driven pinion against rotation, and an output shaft controlled by the driven pinion.

8. A mutliple change speed gear, chiefly for toys and reduced scale models, comprising a plurality of levers, a common spindle forming a pivot for all the levers to allow their shifting between an inoperative medial position and either of two extreme operative positions, a driven wheel revolubly carried by each lever coaxially with said spindle, a sliding gear coplanar with each driven wheel, revolubly carried by the corresponding lever and permanently meshing with the coplanar driven wheel, two driving wheels coplanar with each driven wheel and gear system, rotating in opposite directions round stationary axes located to either side of said system and adapted to be engaged selectively by the corresponding driven wheel upon pivotal shifting of the corresponding lever out of its medial position into an operative position registering with the driving wheel considered, a stationary series of teeth engaging and preventing rotation of each sliding gear when the latter is set with the corresponding lever in its medial inoperative position and an otuput shaft controlled by each of the driven wheels.

References Cited in the file of this patent

UNITED STATES PATENTS

| | | |
|---|---|---|
| 750,874 | Mathews | Feb. 2, 1904 |
| 1,923,995 | Nock | Aug. 22, 1933 |
| 2,836,073 | Masters | May 27, 1958 |